(12) United States Patent
Francisco (10) Patent No.: US 11,716,638 B2
(45) Date of Patent: *Aug. 1, 2023

(54) SYSTEMS AND METHODS FOR PROVIDING SERVICES (71) Applicant: Comcast Cable Communications, LLC, Philadelphia, PA (US)

(72) Inventor: Mark Francisco, Clarksburg, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,267

(22) Filed: Sep. 5, 2019

(65) Prior Publication Data
US 2020/0128413 A1 Apr. 23, 2020

Related U.S. Application Data

(63) Continuation of application No. 15/496,764, filed on Apr. 25, 2017, now Pat. No. 10,455,434, which is a (Continued)

(51) Int. Cl.
*H04W 24/02* (2009.01)
*H04N 21/41* (2011.01)
(Continued)

(52) U.S. Cl.
CPC ........ *H04W 24/02* (2013.01); *H04N 21/2343* (2013.01); *H04N 21/40* (2013.01); *H04N 21/41* (2013.01); *H04N 21/414* (2013.01); *H04N 21/4108* (2013.01); *H04N 21/418* (2013.01); *H04N 21/4112* (2020.08); *H04N 21/4122* (2013.01); *H04N 21/4183* (2013.01);
(Continued)

(58) Field of Classification Search
CPC ... H04W 24/02; H04N 21/2343; H04N 21/40; H04N 21/41; H04N 21/4108; H04N 21/4112; H04N 21/4122; H04N 21/414; H04N 21/418; H04N 21/4183; H04N 21/43635; H04N 21/443; H04N 21/4433; H04N 21/4516; H04N 21/47; H04N 21/472; H04N 21/47202; H04N 21/482; H04N 21/485; H04N 21/6131; H04N 21/41407
See application file for complete search history.

(56) References Cited

U.S. PATENT DOCUMENTS 6,842,460 B1 1/2005 Olkkonen et al.
7,499,462 B2 3/2009 MacMullan et al.
(Continued)

OTHER PUBLICATIONS

U.S. Appl. No. 13/827,613 (U.S. Pat. No 9,674,714), filed Mar. 14, 2013 (Jun. 6, 2017), Mark Francisco.
(Continued)

*Primary Examiner* — Adil Ocak
(74) *Attorney, Agent, or Firm* — Ballard Spahr LLP (57) ABSTRACT

Systems and methods for providing services are disclosed. One method can comprise receiving data having a first format and transmitting the data to a first device. The method may also comprise detecting a second device, automatically recognizing a supported second format of the detected second device, converting the data to the second format, and transmitting the converted data to the second device via wireless communication.

20 Claims, 7 Drawing Sheets

Related U.S. Application Data continuation of application No. 13/827,613, filed on Mar. 14, 2013, now Pat. No. 9,674,714.

(51) Int. Cl.

| | |
|---|---|
| *H04N 21/40* | (2011.01) |
| *H04N 21/482* | (2011.01) |
| *H04N 21/443* | (2011.01) |
| *H04N 21/47* | (2011.01) |
| *H04N 21/418* | (2011.01) |
| *H04N 21/472* | (2011.01) |
| *H04N 21/485* | (2011.01) |
| *H04N 21/414* | (2011.01) |
| *H04N 21/2343* | (2011.01) |
| *H04N 21/4363* | (2011.01) |
| *H04N 21/45* | (2011.01) |
| *H04N 21/61* | (2011.01) |

(52) U.S. Cl.
CPC ..... *H04N 21/43635* (2013.01); *H04N 21/443* (2013.01); *H04N 21/4433* (2013.01); *H04N 21/4516* (2013.01); *H04N 21/47* (2013.01); *H04N 21/472* (2013.01); *H04N 21/47202* (2013.01); *H04N 21/482* (2013.01); *H04N 21/485* (2013.01); *H04N 21/6131* (2013.01); *H04N 21/41407* (2013.01)

(56) References Cited

U.S. PATENT DOCUMENTS

| | | | |
|---|---|---|---|
| 7,911,990 | B2 | 3/2011 | Alam et al. |
| 9,674,714 | B2 | 6/2017 | Francisco |
| 10,455,434 | B2 | 10/2019 | Francisco |
| 2006/0031889 | A1* | 2/2006 | Bennett ............ H04L 65/607 |
| | | | 725/80 |
| 2007/0280646 | A1 | 12/2007 | Seita et al. |
| 2008/0270528 | A1 | 10/2008 | Girardeau et al. |
| 2009/0141894 | A1 | 6/2009 | Sahdra et al. |
| 2010/0060784 | A1 | 3/2010 | Ansari |
| 2010/0070417 | A1 | 3/2010 | Flynn et al. |
| 2010/0138761 | A1 | 6/2010 | Barnes |
| 2010/0169935 | A1 | 7/2010 | Abbruzzese |
| 2010/0257565 | A1 | 10/2010 | Lucas |
| 2010/0268768 | A1* | 10/2010 | Kurtenbach ........ H04L 67/26 |
| | | | 709/203 |
| 2010/0330979 | A1 | 12/2010 | Harris |
| 2011/0010607 | A1 | 1/2011 | Raveendran |
| 2011/0063503 | A1 | 3/2011 | Brand et al. |
| 2011/0078375 | A1 | 3/2011 | Shepherd et al. |
| 2011/0103472 | A1 | 5/2011 | Lefebvre et al. |
| 2011/0225417 | A1* | 9/2011 | Maharajh ......... H04L 65/4076 |
| | | | 713/150 |
| 2011/0321102 | A1 | 12/2011 | Morard et al. |
| 2012/0026278 | A1 | 2/2012 | Goodman et al. |
| 2012/0093237 | A1 | 4/2012 | Stewart |
| 2012/0096299 | A1 | 4/2012 | Kim |
| 2012/0139910 | A1 | 6/2012 | Lee et al. |
| 2012/0180109 | A1 | 7/2012 | Chen |
| 2012/0210381 | A1 | 8/2012 | Ozawa |
| 2013/0104180 | A1* | 4/2013 | Knightbridge ......... H04H 20/93 |
| | | | 725/116 |
| 2013/0152149 | A1 | 6/2013 | Park et al. |
| 2013/0157509 | A1 | 6/2013 | Srivastava et al. |
| 2014/0267900 | A1 | 9/2014 | Francisco |
| 2017/0332253 | A1 | 11/2017 | Francisco |

OTHER PUBLICATIONS

U.S. Appl. No. 15/496,764 (U.S. Pat. No. 10,455,434), filed Apr. 25, 2017 (Oct. 22, 2019), Mark Francisco.

* cited by examiner

SYSTEMS AND METHODS FOR PROVIDING SERVICES

CROSS REFERENCE TO RELATED PATENT APPLICATIONS

This application is a continuation of U.S. patent application Ser. No. 15/496,764, filed Apr. 25, 2017, which is a continuation of U.S. patent application Ser. No. 13/827,613, filed Mar. 14, 2013, issued as U.S. Pat. No. 9,674,714, all of which are herein incorporated by reference in their entirety.

SUMMARY

It is to be understood that both the following general description and the following detailed description are exemplary and explanatory only and are not restrictive, as claimed. Provided are methods and systems for providing services. In an aspect, services can be provided to mobile devices and/or wireless devices. As an example, high-definition multimedia interface (HDMI) data can be adapted and transmitted to a wireless device. Accordingly, the adaptation can facilitate consumption of the data via a mobile device. As a further example, a user experience can be generated on the mobile device, transmitted, and presented via a display such as a television.

In an aspect, methods for providing services to a wireless device can comprise receiving data having a first format and transmitting the data to a first device. The methods can further comprise detecting a second device. A supported second format of the detected second device can be automatically recognized and the data can be converted to the second format. The converted data can be transmitted to the second device via wireless communication.

In another aspect, methods can comprise establishing an association with a device via an ad hoc network. Configuration data that relates to a second network can be received from the device. Communication with the second network can be configured based upon the configuration data.

In a further aspect, the methods can comprise receiving first data having a first format and transmitting the first data to a first device. The methods can further comprise detecting a second device. A supported second format of the detected second device can be automatically recognized and second data having the second format can be received from the second device. The second data can be converted from the second format to the first format. The converted data can be transmitted to the first device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for providing services. In an aspect, services can be provided to one or more mobile devices. As an example, formatted data such as high-definition multimedia interface (HDMI) data can be adapted and transmitted to a wireless device. Accordingly, the adaptation can facilitate consumption of the data via a mobile device. As a further example, a user experience can be generated on the mobile device, transmitted, and presented via a display such as a television. The display and the mobile device can share content in a bidirectional manner. Content presented via the mobile device can be transmitted and presented via the display. Content presented via the display can be transmitted and presented via the mobile device. The content displayed via one or more of the mobile device and the display can be a merged content received from one or more sources.

Figure 1:
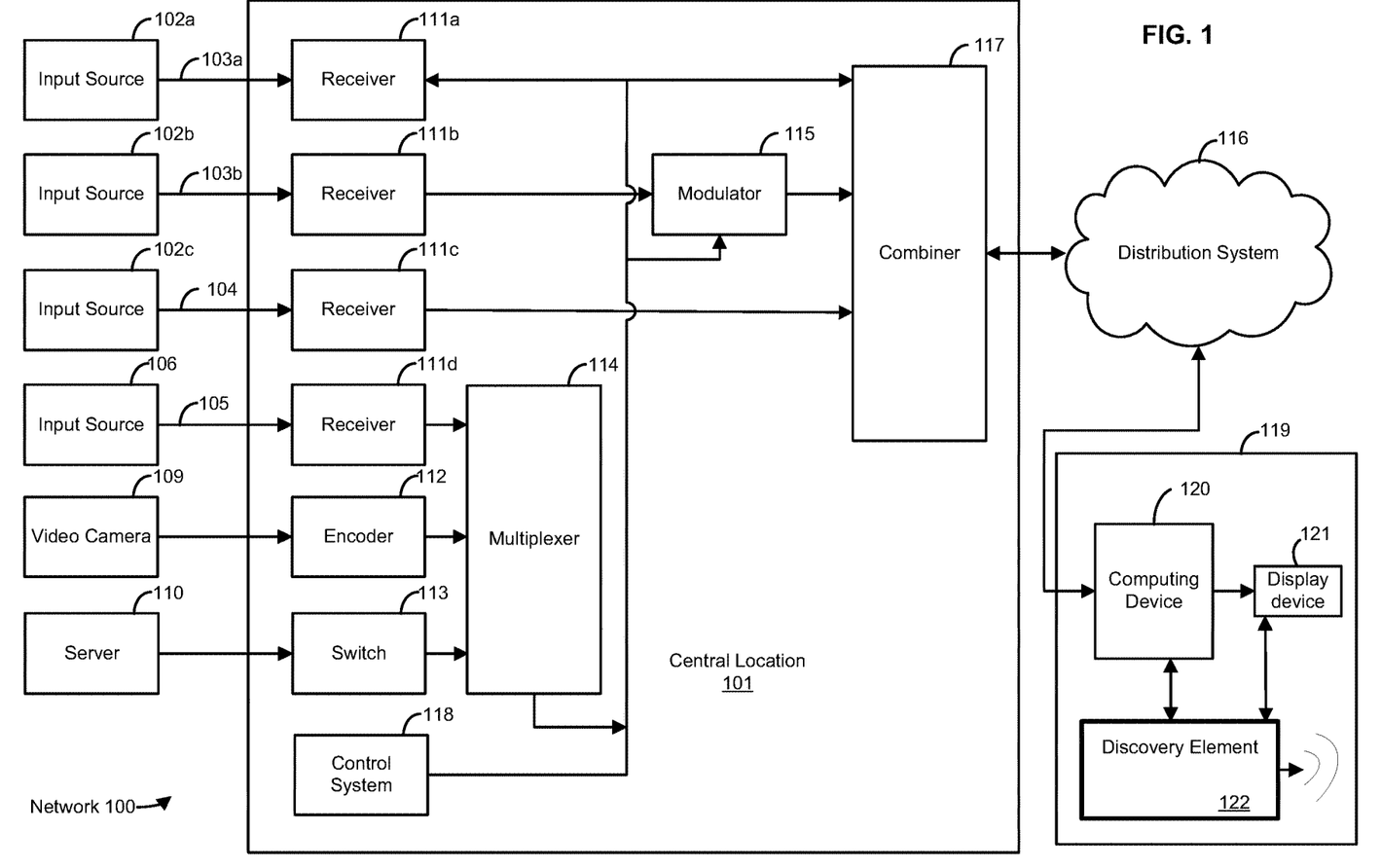
FIG. 1 is a block diagram of an exemplary system and network.

In an aspect, a system can be configured to provide services such as content related services to a user device. FIG. 1 illustrates various aspects of an exemplary network in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming) from multiple sources. The central location 101 can combine the content from the various sources and can distribute the content to user locations, such as location 119, via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content can also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a computing device 120, such as a decoder, gateway, game console, or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a set-top box, a computer, a TV, a monitor, or satellite dish. In an exemplary aspect, the methods and systems disclosed can be located within, or performed on, one or more CT's, display devices 121, central locations 101, DVR's, home theater PC's, and the like. As an example, the computing device 120 can receive and process embedded markers, flags, and signals in the content data stream for controlling a content received by the computing device 120. As a further example, the computing device 120 can be configured to interface with various protocols and interfaces such as Internet protocol (IP), radio frequency (RF), WiFi, Bluetooth, ZigBee, component, Multimedia over Coax Alliance (MoCA), Digital Living Network Alliance (DLNA), OpenCable, Digital Video Broadcasting (DVB), S-video, HDMI and the like.

In an aspect, a discovery element 122 can be in communication with one or more of the computing device 120 and the distribution system 116. An element, such as the discovery element 122, can be or comprise hardware and software and can be stand-alone or integrated with another element, device, or system. In another aspect, the discovery element 122 can be configured as an in-line hardwire interface to wireless adapter. In a further aspect, discovery element 122 can comprise an input (e.g., HDMI 1.3a compatible Type A plug (male) integrated or on shielded HDMI 1.3a compatible cable (Category-2)), an output (e.g., HDMI 1.3a compatible Type A receptacle (female)), and an IR blaster extension (e.g., 3.5 mm mono (TS) miniature Jack (tip positive)). As an example, the discovery element 122 can be configured to support wireless communication such as via 802.11n, WEP, WPA Personal, WPA/WPA2 Personal, WPA2 Personal, and the like. As another example, the discovery element 122 can be configured as a HDMI to WiFi adapter. As a further example, the discovery element 122 can receive data from a data source (e.g., HDMI source) such as the computing device 120. In an aspect, the discovery element 122 can be configured to encode data in a format (e.g., H.264 Main Level) that can be viewed by wireless and/or mobile devices. As such, when a user device such as a mobile device requests to view the output of the HDMI source, the discovery element 122 can transmit data in a converted format wirelessly to the mobile device. The user device can then present the converted data (e.g., content). As an example, the converted data can be protected with a suitable technology such as HDCP2.0. Other technologies can be used such as WiFi Display (Miracast http://www.wi-fi.org/wi-fi-certified-miracast™), DLNA Premium, MPEG-DASH, and the like. Meanwhile, the display 121 can present the same content based upon the output from the data source (e.g., HDMI source).

In an aspect, a discovery method can be provided by discovery element 122 to allow the discovery element 122 to find one or more devices on a network. Once discovered, the one or more detected devices can be queried and can respond with the state information (e.g., power-on, power-off) relating to the one or more devices (or a connected device such as a display). The state information can be used to determine connectivity between the discovery element 122 and the one or more detected devices. In an aspect, state information can also comprise information relating to the current processes operating on the one or more detected devices. As an example, if a detected device is determined to already be sharing services such as content delivery services with another device, the discovery element 122 can determine whether to seek out another detected device. The state information can comprise other information relating to the detected devices.

In an aspect, the discovery element 122 can generate a discrete wireless network. As an example, the discrete wireless network can be a WiFi network. As a further example, the discrete wireless network can be an ad hoc network. In an aspect, user devices such as a mobile device can join (e.g., connect to) the discrete wireless network for the purpose of reconfiguring the discovery element 122 to join a local network (e.g., LAN, WLAN, etc.) to which the user device is already connected. In particular, the user device can transmit configuration information to the discovery element 122 to facilitate the discovery element 122 connecting to the local network. After joining the local network, discovery element 122 can interact with the devices that are connected to the local network. As an example, a device can be connected to a WLAN in a home or office. The device can discover the ad hoc network generated by the discovery element 122 and can connect to the ad hoc network. Since the connected device has the configuration information necessary to connect to the WLAN (as the device is or has previously connected to the WLAN), the device can share the configuration information with the discovery element 122 via the ad hoc network. Once the discovery element 122 receives the configuration information for the WLAN, the discovery element 122 can be automatically configure to connect to the WLAN.

In an aspect, the discovery element 122 can be configured to update local software from a local (e.g., USB) and/or remote (e.g., Internet server) source. In another aspect, discovery element 122 can be configured to log activity and make logging data available for analysis.

In an aspect, content can be presented via a user device and the user device can transmit data representing the presented content to the discovery element 122. Accordingly, discovery element 122 can convert the data received from the user device for presentation on one or more connected devices such as the display 121. As an example, graphics from the user device can be overlaid onto video transmitted from the computing device 102 to the display 121 (e.g., via the discovery element 122). As a further example, a customized user experience can be presented on the user device and shared with a second device such as the display 121. In an aspect, the user experience can be generated on the user device and at least a portion of the user experience can be shared with a second device. As an example, the user experience of the user device can be replicated and shared with a second device.

Figure 2:
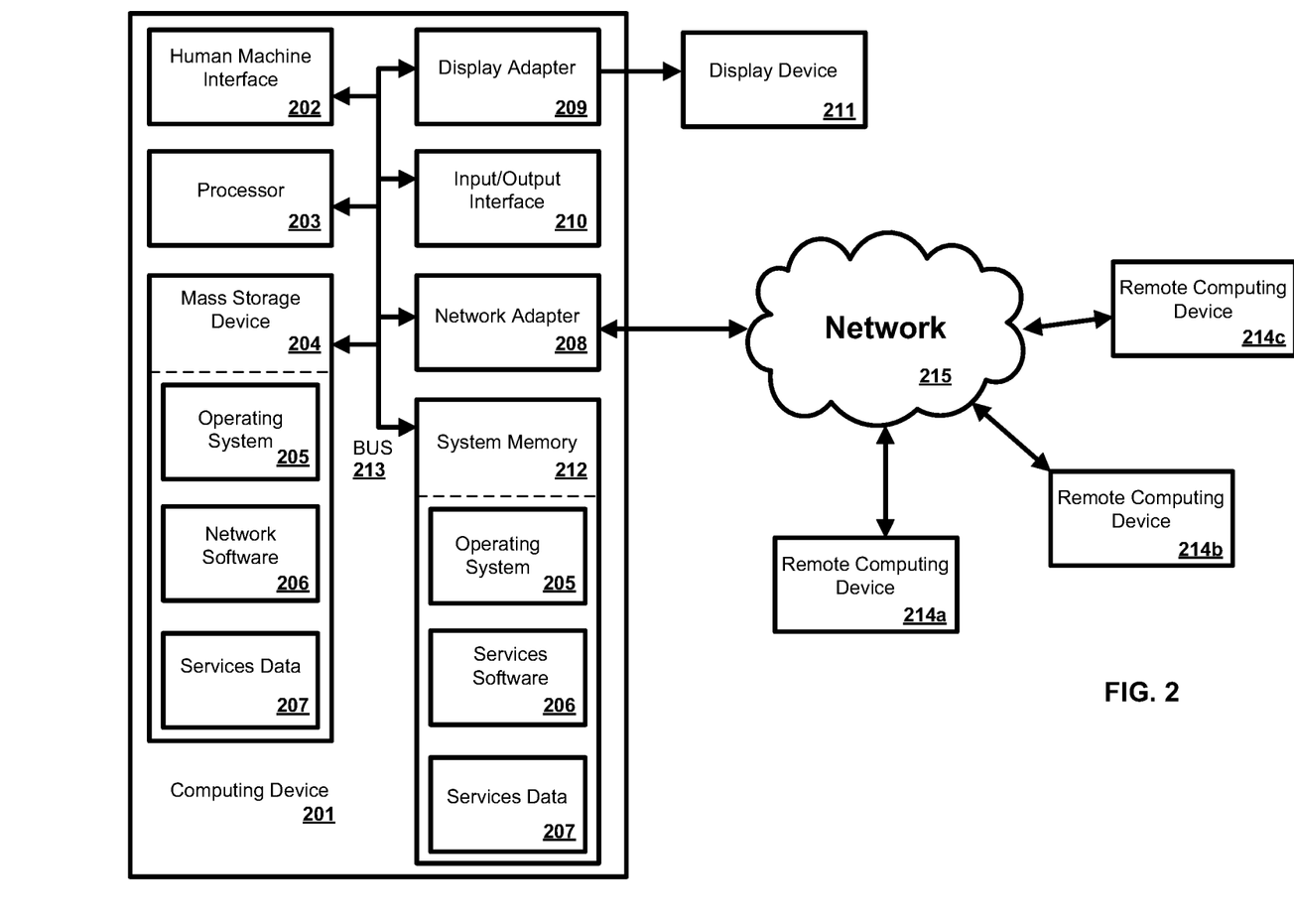
FIG. 2 is a block diagram of an exemplary computing device.

In an exemplary aspect, the methods and systems can be implemented on a computing system such as computing device 201 as illustrated in FIG. 2 and described below. By way of example, one or more of the computing device 120 and the discovery element 122 of FIG. 1 can be a computing device as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, services software 206, services data 207, a network adapter 208, system memory 212, an Input/Output Interface 210, a display adapter 209, a display device 211, and a human machine interface 202, can be contained within one or more remote computing devices 214a, b, c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as services data 207 and/or program modules such as operating system 205 and services software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and services software 206. Each of the operating system 205 and services software 206 (or some combination thereof) can comprise elements of the programming and the services software 206. Services data 207 can also be stored on the mass storage device 204. Services data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a, b, c. By way of example, a remote computing device can be a personal computer, portable computer, a smart phone, a server, a router, a network computer, a peer device or other common network node, and so on. Logical connections between the computing device 201 and a remote computing device 214a, b, c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of services software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
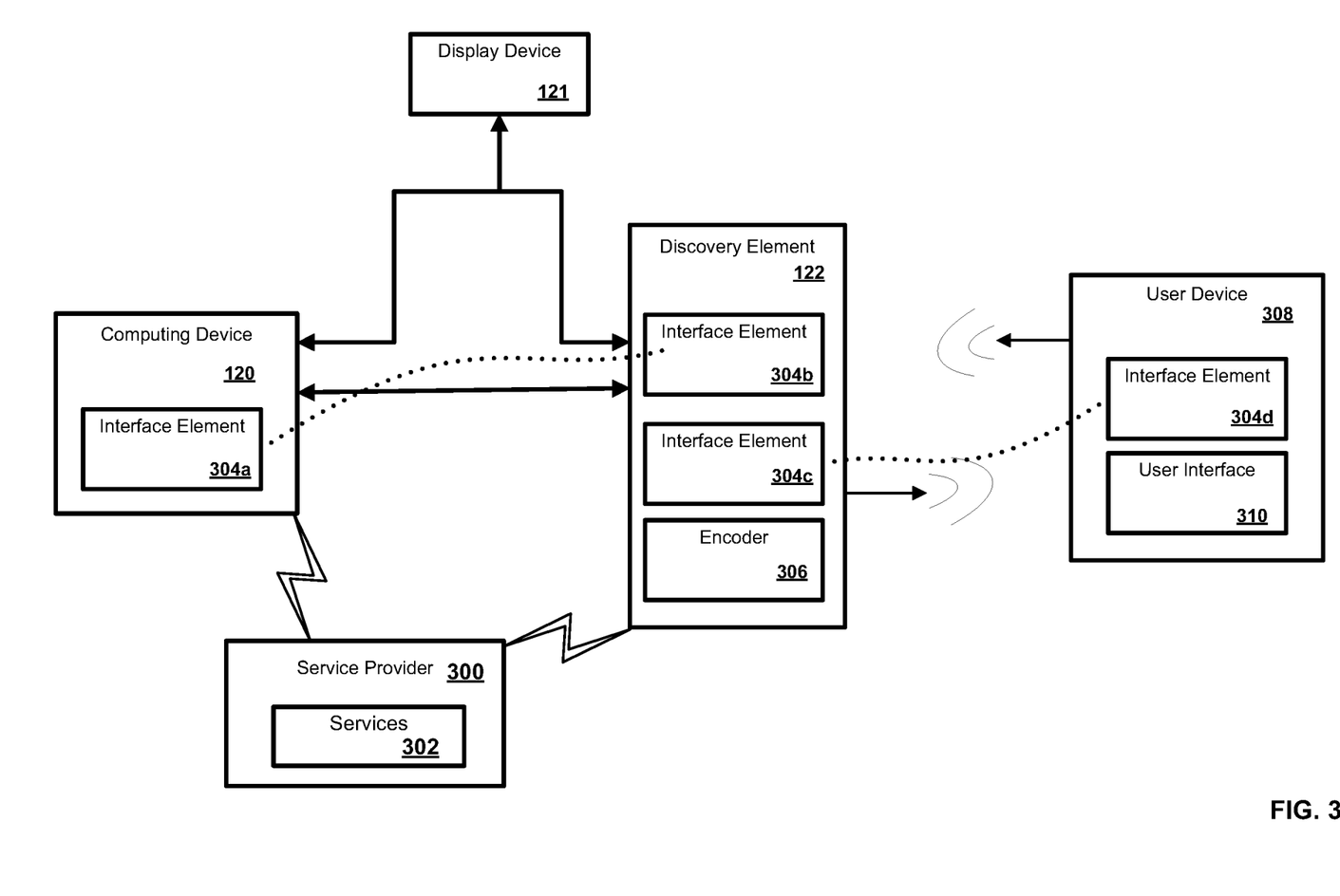
FIG. 3 is a diagram of an exemplary system and network.
Figure 4:
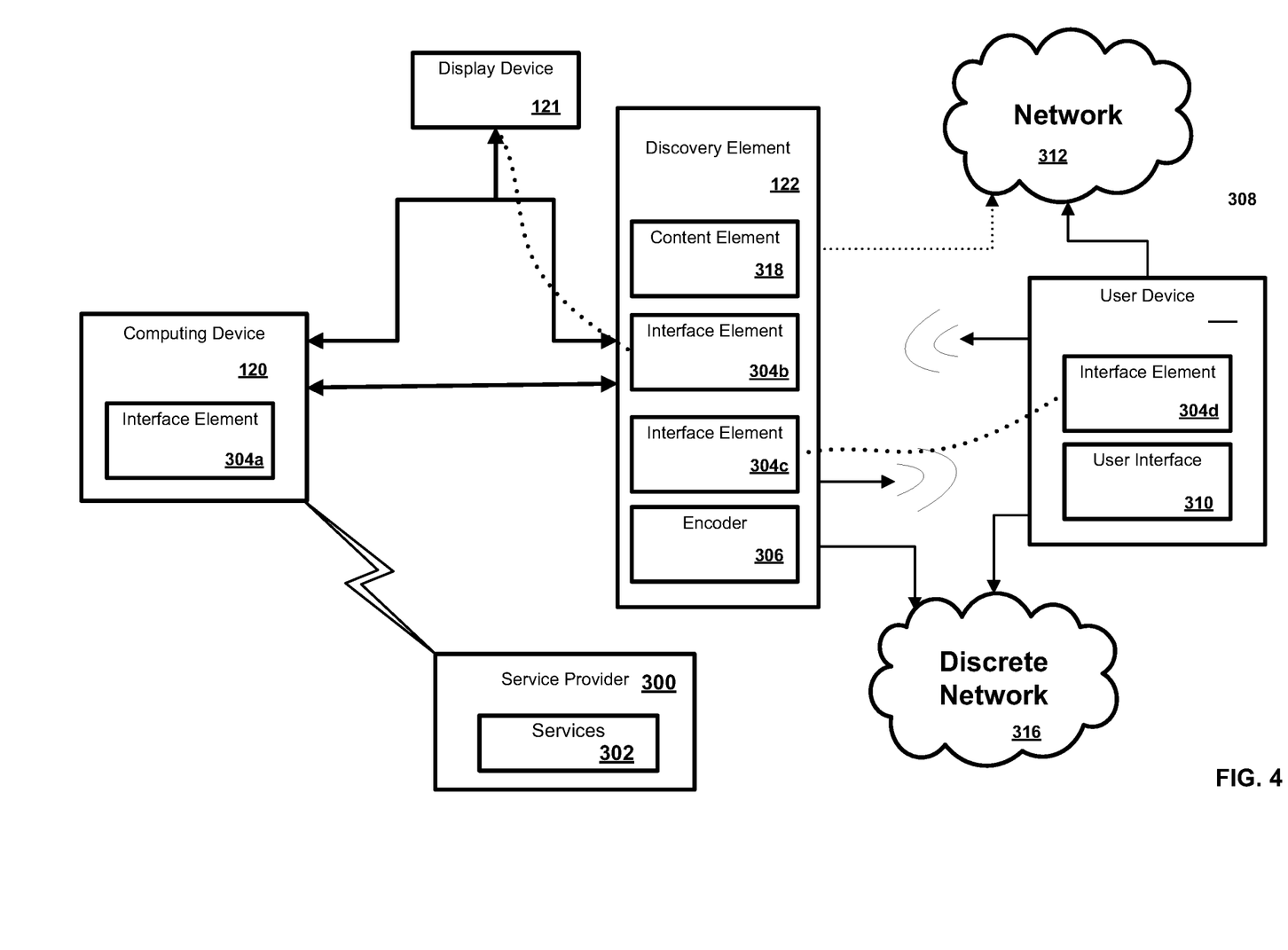
FIG. 4 is a diagram of an exemplary system and network.

FIGS. 3-4 illustrate an exemplary system and network in which the systems and methods of the present disclosure can operate. In an aspect, a discovery element 122 can be in communication with one or more of the computing device 120 and a service provider 300 to receive one or more services 302. As an example, service provider 300 can be a content provider, security provider, communications provider, Internet provider, and the like. As an example, services 302 can comprise content, interactive media, and/or data relating to the service provider. As a further example, the services can be presented via the display device 121 through one or more of the computing device 120 and the discovery element 122.

In an aspect, the discovery element 122 can be configured as an in-line hardwire interface to wireless adapter, as illustrated in FIG. 3. As an example, the discovery element 122 can be configured as a HDMI to WiFi adapter. As a further example, the discovery element 122 can receive data from a data source (e.g., HDMI source) such as the computing device 120. In an aspect, one or more interface elements 304a, 304b can facilitate the communication between the computing device 120 and the discovery element 122. As an example, the one or more interface elements 304a, 304b can be HDMI or other protocols, logical, and/or physical interfaces such as Internet protocol (IP), radio frequency (RF), WiFi, Bluetooth, ZigBee, component, Multimedia over Coax Alliance (MoCA), Digital Living Network Alliance (DLNA), OpenCable, Digital Video Broadcasting (DVB), S-video, and the like.

In an aspect, the discovery element 122 can be configured to encode data in a format (e.g., H.264 Main Level) that can be viewed by user devices. As an example, an encoder 306 can be configured to receive data in a first format (e.g., Internet protocol (IP), radio frequency (RF), WiFi, Bluetooth, ZigBee, component, Multimedia over Coax Alliance (MoCA), Digital Living Network Alliance (DLNA), OpenCable, Digital Video Broadcasting (DVB), S-video, and the like) and encode (e.g., convert, transcode, format, reformat, etc.) the data into a second format (e.g., wireless format such as 802.11n, WEP, WPA Personal, WPA/WPA2 Personal, WPA2 Personal, and the like).

In an aspect, when a user device 308 such as a mobile device or wireless device requests to view the output of the HDMI source, the discovery element 122 can transmit data in a converted format wirelessly to the user device. As an example, one or more interface elements 304c, 304d can facilitate communication between the discovery element 122 and the user device 308. As a further example, the one or more interface elements 304c, 304d can be wireless interfaces such as WiFi transmitter/receivers or radios.

In an aspect, the user device 308 can receive the converted data and can present the converted data (e.g., content) via a user interface 310. As an example, the user interface can be a display, a touchscreen, or other interface to facilitate user interaction with the user device 308. As a further example, the converted data can be protected with a suitable technology such as HDCP2.0. Meanwhile, the display 121 can present the same content based upon the output from the data source (e.g., HDMI source).

As illustrated in FIG. 4, a discovery method can be provided by discovery element 122 to allow the discovery element 122 to locate one or more devices (e.g., user device 308) on a network 312 such as a local network. In an aspect, the discovery element 122 can generate a discrete wireless network 316. As an example, the discrete wireless network 316 can be a WiFi network. As a further example, the discrete wireless network 316 can be ad hoc network. In an aspect, the user device 308 can join (e.g., connect to) the discrete wireless network 316 for the purpose of reconfiguring discovery element 122 to join the local network 312 to which the user device is already connected. In particular, the user device 308 can transmit configuration information to the discovery element 122 to facilitate the discovery element 122 connecting to the local network 312. After joining the local network 312, discovery element 122 can interact with devices that are connected to the local network.

In an aspect, data such as content presented via the user device 308 can be transmitted to the discovery element 122. Accordingly, discovery element 122 can convert the data received from the user device 308 for presentation on one or more connected devices such as the display 121. In an aspect, a content element 318 can be configured to receive content data from various sources (e.g., service provider 300, computing device 120, user device 308, etc.). As an example, the content element 318 can be configured to overlay graphics from the user device 308 onto video transmitted from the computing device 102 to the display 121 (e.g., via the discovery element 122). As a further example, a customized user experience can be presented on the user device 308 and shared with a second device such as the display 121. In an aspect, the user experience can be generated on the user device 308 and at least a portion of the user experience can be shared with a second device. As an example, the user experience of the user device 308 can be replicated and shared with a second device.

In an aspect, discovery element 122 can be configured to transmit (e.g., via WiFi) a default SSID. As an example, discovery element 122 can be configured with a unique SSID that is communicated to a device such as the user device 308 seeking to communicate with the discovery element 122. As another example, the discovery element 122 can be associated with one or more SSIDs. As a further example, the discovery element 122 can establish a peer-to-peer connection with one or more devices, such as the user device 308.

In an aspect, the discovery element 122 can support WiFi Protected Setup (WPS). As an example, pairing between the discovery element 122 and a device such as the user device 308. As a further example, pairing can be facilitated via the UPnP architecture as defined in UPnP™ Device Architecture 1.1, Document Revision Date: Oct. 15, 2008, hereby incorporated herein by reference in its entirety. As such, the discovery element 122 can advertise itself as a UPnP Media Server. The discovery element 122 can accept a pairing request from any client application when in an 'Un-Paired' state. Accordingly, the discovery element 122 can establish pairing with a device such as the user device 308 or other client. The discovery element 122 can request the client's capabilities from the client application at the time of pairing is established. As an example, client capability information can be maintained and or monitored for the duration of the pairing with the client. As a further example, a pairing can be rejected based on the capabilities of the client as informed by the client.

In an aspect, one or more discovery elements 122 can facilitate transmission of data (e.g., an IP video stream, file based transfer of content, communication services, etc.) to one or more receiving devices. As an example, a single discovery element 122 can be configured to communicate with a single receiver (i.e., a 1:1 experience). As a further example, multiple discovery elements 122 can be configured to communicate with one or more receivers (i.e., a N:M experience).

In the 1:1 scenario, a discovery element 122 can transmit information relating to communicating with the discovery element 122 via a wireless network. In an aspect, a user can view, using an application (e.g., user interface 310) executing on a user device for example, the discovery element 122 that is currently active on the local WiFi network. The application can identify the presence of the discovery element 122 and, upon establishing communication with the discovery element 122, the application can begin streaming video. If a user interacts with the application, for example, to change the channel, the user can invoke such an action via an interface of the user device. This action can cause a signal to be transmitted to the source of the video. As a further example, such an action can cause the channel on the source to be changed, thereby resulting in the updated video being transmitted to the user device.

In the N:M scenario, a plurality of discovery elements 122 can transmit information relating to communicating with one or more of the discovery element 122 via a wireless network. In an aspect, a user can view, using an application executed on a user device for example, the discovery elements 122 that are currently active on the local WiFi network. The application can identify the presence of the discovery elements 122 and, upon establishing communication with one of the discovery elements 122, the application can begin streaming video. As such, other of the discovery elements 122 can be available for communication with other devices seeking connectivity. If a user interacts with the application, to change the channel for example, the user can invoke such an action via an interface of the user device. This action can cause a signal to be transmitted to the source of the video. As a further example, such an action can cause the channel on the source to be changed, thereby resulting in the updated video being transmitted to the user device.

In an aspect, discovery element 122 can be configured to track and report on usage and performance of the discovery elements 122. As an example, the discovery element 122 can be configured to log defined events, store logged events, upload logs to a central service, and perform analytics regarding the operation of the discovery element 122.

In an aspect, one or more user devices 308 can comprise an application such as user interface 310 configured to facilitate a universal plug and play (UPnP) control point, undertaking discovery of one or more discovery elements 122 on the network and recognizing the status of the discovery elements 122. In another aspect, the user interface 310 can be configured to display the available discovery elements 122 and the current status (e.g., paired, unpaired, streaming, etc.). As an example, the user interface 310 can be configured to facilitate pairing with one or more discovery elements 122. As a further example, the user interface 310 can support Extended Display Identification Data (EDID) to communicate the configuration of the user device 308 to the discovery element 122.

In an aspect, one or more user devices 308 can comprise an application such as user interface 310 configured to support High-Bandwidth Digital Copy Protection Interface Independent Adaptation (HDCP IIA) and to comply with HDCP Revision 2.0. In another aspect, the user interface 310, or other application, can be configured to consume an AVC/H.264 A/V stream from a discovery element 122 (e.g., via real-time transport protocol (RTP) container). As an example, the user interface 310 can control an RTP delivery using real-time streaming protocol (RTSP). As an example, the user interface 310 can be configured to facilitate user interaction with a computing device such as computing device 120 to Power-on/off, Channel change, perform VOD discovery and control/trick-play, execute DVR controls, perform PIN control entry, and the like.

In an aspect, one or more user devices 308 can comprise an application such as interface element 304*d* and/or user interface 310 configured to support peer-to-peer WiFi connection to any discovery element 122 that is broadcasting an SSID. In another aspect, the application can be configured to provide access to configurations of the discovery element 122 when connected through the SSID transmitted by the discovery element 122. As an example, the application can require the user to successfully authenticate with the multisystem operator (MSO) before granting access to configuration and/or an administration panel.

Figure 5:
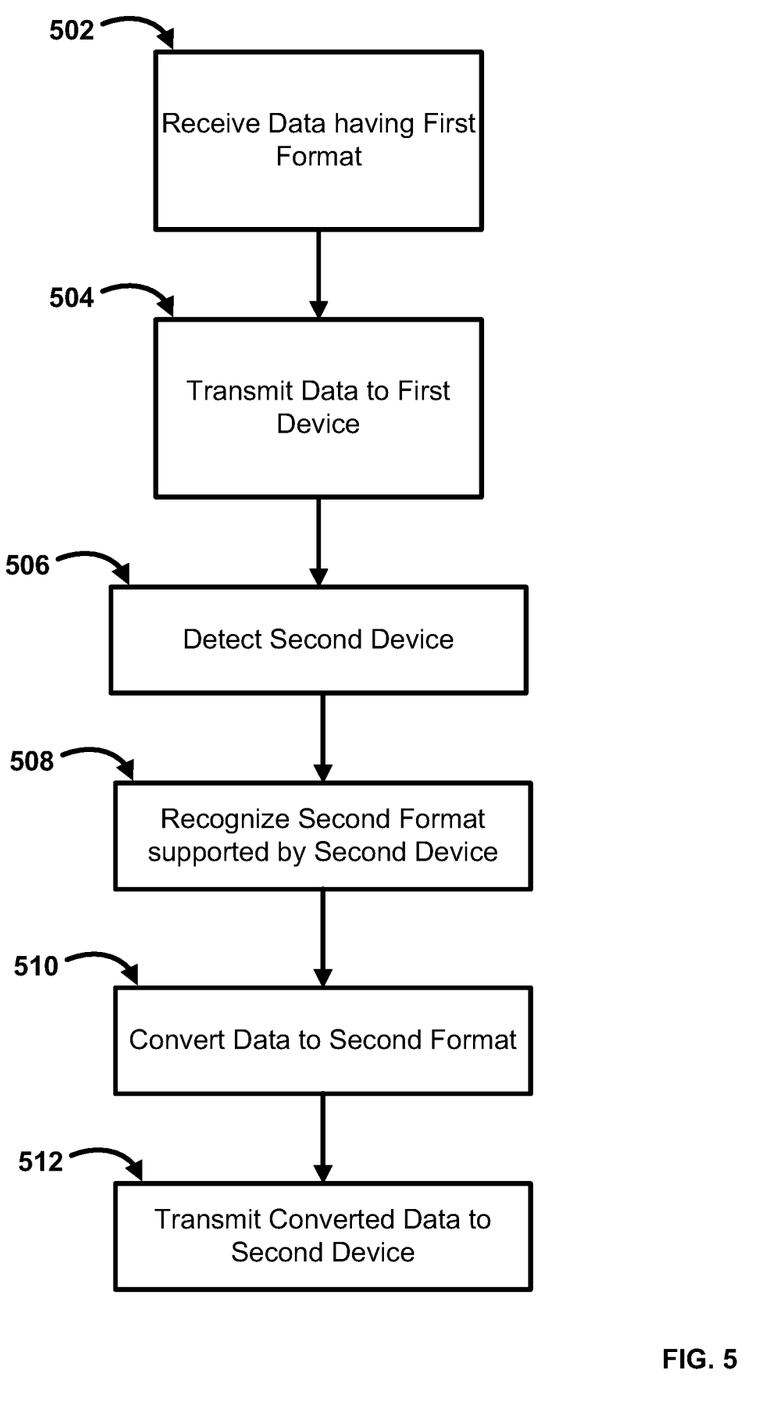
FIG. 5 is a flow chart of an exemplary method.

An exemplary method for providing one or more services is shown in FIG. 5. In step 502, data can be accessed or received in a first format. In an aspect, the first format can be compatible with high-definition multimedia interface. As a further example, the first format can be compatible with other protocols and communications means such as Internet protocol (IP), radio frequency (RF), WiFi, Bluetooth, ZigBee, component, Multimedia over Coax Alliance (MoCA), Digital Living Network Alliance (DLNA), OpenCable, Digital Video Broadcasting (DVB), S-video, HDMI and the like.

In step 504, the data can be transmitted to a first device. In an aspect, the first device can be configured to present one or both of an audio output and a visual output based upon the transmitted data having the first format. As an example, the first device can comprise a display for presenting visual output such as video, images, text, and the like. As another example, the first device can comprise a decoder, communication terminal, converter, and the like. As a further example, the audio output can comprise sound (inaudible and/or audible), tones, and the like.

In step 506, a second device can be detected. In an aspect, the second device can be a mobile device and/or a wireless device, such as a storage, processing, or presentation device. In another aspect, the second device can transmit a request for connection. As an example, the request for connection can comprise a request to join a network such as a local area network (e.g., LAN, WLAN, etc.). As a further example, the second device can be configured to connect to the network in response to processing the request.

In step 508, a supported second format of the detected second device can be recognized. The second format can be a wireless format or protocol for wireless communication. As an example, the second format can be a mobile format configured for processing by mobile devices. In an aspect, the supported second format can be automatically recognized. As an example, automatically recognizing a supported second format of the detected second device can comprise identifying configurations of the second device, the configurations comprising one or more of compatibility, connectivity, resolution, bit-rate, and the like. The second device can also transmit (e.g., broadcast) its desired settings for the second format. As a further example, the supported second format can be or comprise a mobile device format such as 3GP, 3G2, MP4, H.264 Main Level, and the like. In an aspect, the second device can transmit configurations such as capability information to a recipient device such as the discovery element 122. Other devices in communication with the second device can be the recipient device for receiving capability information relating to the second device.

In step 510, the data (e.g., any portion of data, such as part of a content item) can be converted to the second format. In an aspect, the data can be converted by an encoder, transcoder, interface, or similar device, software, or combinations thereof. In step 512, the converted data can be transmitted to the second device via wireless communication. In an aspect, the converted data can be transmitted to the second device in an encrypted form. In another aspect, the wireless communication can be at least part of a local area network.

Figure 6:
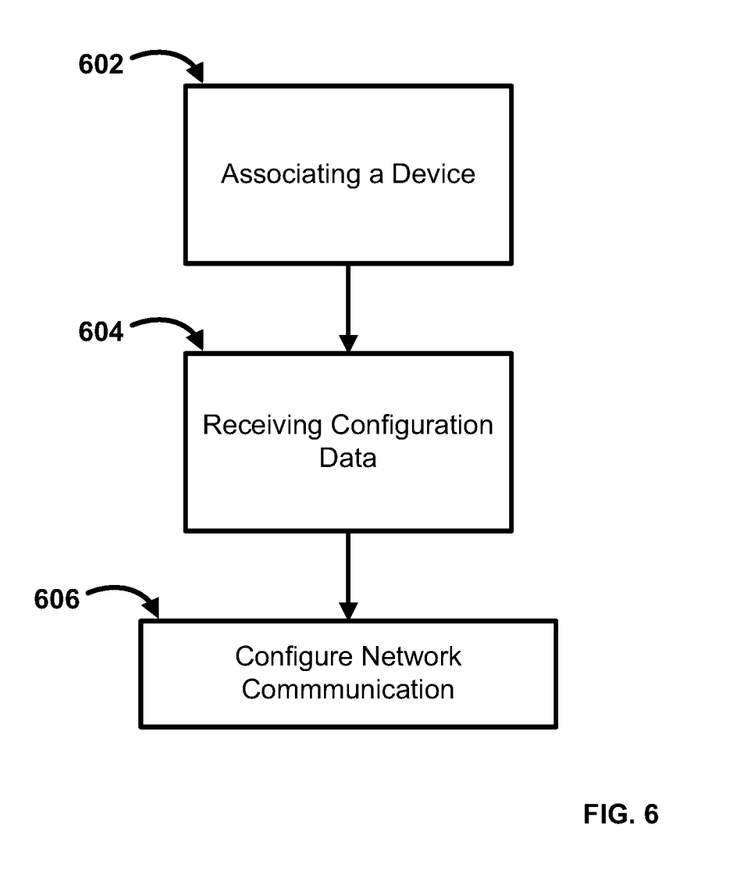
FIG. 6 is a flow chart of an exemplary method.

In an aspect, illustrated in FIG. 6, provided is an exemplary method for providing one or more services. In step 602, a device can be associated via an ad hoc network. The ad hoc network can be a LAN, WLAN, configuration network, or the like. The device can be a user device such as a wireless device, mobile device, communication terminal, display, and the like. In an aspect, the device can be associated with another device via the ad hoc network. As an example, associating the device can comprise connecting to the device to the ad hoc network. As an example, the device can be associated with a source of the ad hoc network. As a further example, the association with the source can comprise being coupled to the same network, registered to a particular user or premises, authorized under the same credentials, and the like.

In step 604, configuration information can be received from the device. In an aspect, the configuration information can relate to a second network. As an example, the configuration information can comprise network connectivity data relating to at least a wireless network. As a further example, the second network can be or comprise a local area network.

In step 606, communication with the second network can be configured based upon the configuration information. In an aspect, configuring communication comprises joining the second network.

Figure 7:
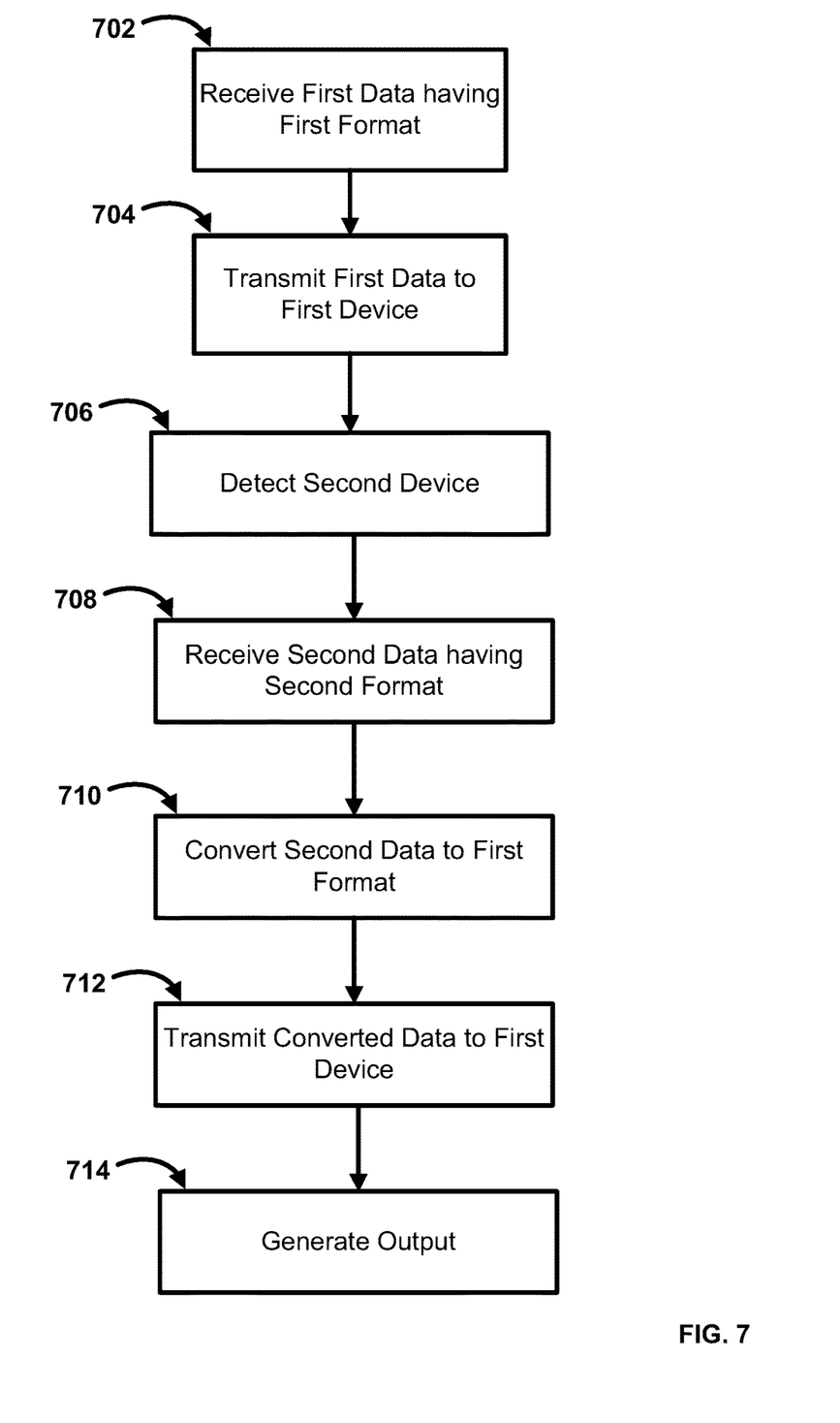
FIG. 7 is a flow chart of an exemplary method.

In an aspect, illustrated in FIG. 7, provided is an exemplary method for providing one or more services via a remote device. In step 702, first data can be accessed or received in a first format. In an aspect, the first format can be compatible with high-definition multimedia interface (HDMI), Internet protocol (IP), radio frequency (RF), WiFi, Bluetooth, ZigBee, component, Multimedia over Coax Alliance (MoCA), Digital Living Network Alliance (DLNA), OpenCable, Digital Video Broadcasting (DVB), S-video, and the like In step 704, the first data can be transmitted to a first device. In an aspect, the first device can be configured to present one of an audio output and a visual output based upon the transmitted data having the first format. As an example, the first device can comprise a display for presenting visual output such as video, images, text, and the like. As another example, the first device can comprise a decoder, communication terminal, converter, and the like. As a further example, the audio output can comprise sound (inaudible and/or audible), tones, and the like.

In step 706, a second device can be detected. In an aspect, the second device can be a mobile device and/or a wireless device. As an example, the second device can be discovered by joining or being joined to a network. As a further example, detecting the second device can comprise communicating with the second device.

In step 707, a supported second format of the detected second device can be recognized. As an example, the supported second format can be a content presentation format. As a further example, the supported second format can be a mobile format such as such as 3GP, 3G2, MP4, H.264 Main Level, and the like. Other formats can be supported by the second device. In an aspect, the supported second format can be automatically recognized. As an example, automatically recognizing a supported second format of the detected second device can comprise identifying configurations of the second device, the configurations comprising one or more of compatibility, connectivity, resolution, and bit-rate. As a further example, the supported second format can be recognized by querying the second device, by having the second device make the supported second format discoverable, by analyzing available or shared configuration information, or the like.

In step 708, the second data in the second format can be received from the second device. In an aspect, the second data can be received via wireless communication. In step 710, the second data from the second format can be converted to the first format. In an aspect, the second data can be converted by an encoder, transcoder, interface, or similar device, software, or combinations thereof.

In step 712, the converted second data can be transmitted to the first device. In step 714, an output can be generated. In an aspect, the first device can generate the output or can present the generated output. As an example, the output can be generated based upon the first data or the converted data, or a combination thereof. As another example, the output can comprise merged images based upon the first data and the converted data. As a further example, the output can comprise overlaid images based upon the first data and the converted data.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
 receiving, by a computing device, from a user device, and based on detection of the user device configured to cause a first output of first content in a first format, the first content in the first format;
 converting, by the computing device, the first content from the first format to a second format; and
 generating, by the computing device, a second output comprising second content and the converted first content.

2. The method of claim 1, further comprising:
 sending a query to the user device; and
 receiving, based on the query, state information of the user device, wherein receiving the first content is further based on the state information.

3. The method of claim 2, wherein sending the query to the user device is based on the detection of the user device.

4. The method of claim 1, wherein receiving the first content is based on configuration information of a second user device.

5. The method of claim 1, wherein the user device is associated with configuration information indicative of the first format.

6. The method of claim 1, wherein the second output comprises the second content merged with the converted first content in the second format.

7. The method of claim 1, wherein the second output comprises the converted first content overlaid with the second content in the second format.

8. A system comprising:
 a user device configured to:
  send first content in a first format; and
  cause a first output of the first content; and
 a computing device configured to:
  receive, from the user device and based on detection of the user device, the first content in the first format;
  convert the first content from the first format to a second format; and
  generate a second output comprising second content and the converted first content.

9. The system of claim 8, wherein the computing device is further configured to:
 send a query to the user device; and
 receive, based on the query, state information of the user device, wherein receiving the first content is further based on the state information.

10. The system of claim 9, wherein the query is sent based on the detection of the user device.

11. The system of claim 8, wherein the first content is received based on configuration information of a second user device.

12. The system of claim 8, wherein the user device is associated with configuration information indicative of the first format.

13. The system of claim 8, wherein the second output comprises the second content merged with the converted first content in the second format.

14. The system of claim 8, further comprising a display output device to output the second output, wherein the second output comprises the converted first content overlaid with the second content in the second format.

15. An apparatus comprising:
 one or more processors; and
 memory storing processor-executable instructions that, when executed by the one or more processors, cause the apparatus to:
  receive, from a user device and based on detection of the user device configured to cause a first output of first content in a first format, the first content in the first format;
  convert the first content from the first format to a second format; and
  generate a second output comprising second content and the converted first content.

16. The apparatus of claim 15, wherein the processor-executable instructions, when executed by the one or more processors, further cause the apparatus to:
 send a query to the user device; and receive, based on the query, state information of the user device, wherein receiving the first content is further based on the state information.

17. The apparatus of claim 16, wherein the processor-executable instructions that, when executed by the one or more processors, cause the apparatus to send the query, cause the apparatus to send the query based on the detection of the user device.

18. The apparatus of claim 15, wherein the first content is received based on configuration information of a second user device.

19. The apparatus of claim 18, wherein the memory processor-executable instructions, when executed by the one or more processors, further cause the apparatus to output the second output, wherein the second output comprises the converted first content overlaid with the second content in the second format.

20. The apparatus of claim 15, wherein the user device is associated with configuration information indicative of the first format.

* * * * *